US009813236B2

(12) United States Patent
Buer

(10) Patent No.: US 9,813,236 B2
(45) Date of Patent: *Nov. 7, 2017

(54) MULTI-FACTOR AUTHENTICATION USING A SMARTCARD

(75) Inventor: Mark Buer, Gilbert, AZ (US)

(73) Assignee: Avago Technologies General IP (Singapore) Pte Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 13/533,523

(22) Filed: Jun. 26, 2012

(65) Prior Publication Data
US 2012/0272307 A1 Oct. 25, 2012

Related U.S. Application Data

(63) Continuation of application No. 11/599,328, filed on Nov. 15, 2006, now Pat. No. 8,245,292.

(60) Provisional application No. 60/737,659, filed on Nov. 16, 2005.

(51) Int. Cl.
G06F 21/30 (2013.01)
H04L 9/08 (2006.01)
G06F 21/34 (2013.01)
H04L 9/32 (2006.01)
H04L 29/06 (2006.01)

(52) U.S. Cl.
CPC ............ H04L 9/0825 (2013.01); G06F 21/34 (2013.01); H04L 9/3228 (2013.01); H04L 9/3234 (2013.01); H04L 63/0853 (2013.01); H04L 63/0823 (2013.01); H04L 63/0838 (2013.01); H04L 2209/56 (2013.01); H04L 2209/805 (2013.01); H04L 2463/082 (2013.01)

(58) Field of Classification Search
None
See application file for complete search history.

(56) References Cited

U.S. PATENT DOCUMENTS

| 6,067,621 | A | * | 5/2000 | Yu et al. ........................ 713/172 |
| 6,874,084 | B1 | * | 3/2005 | Dobner et al. ................ 713/156 |
| 7,050,997 | B1 | * | 5/2006 | Wood, Jr. ............... G06Q 40/06 705/36 R |
| 2005/0269401 | A1 | * | 12/2005 | Spitzer et al. ................ 235/380 |
| 2006/0294023 | A1 | | 12/2006 | Lu | |

* cited by examiner

Primary Examiner — Izunna Okeke
(74) Attorney, Agent, or Firm — Sterne, Kessler, Goldstein & Fox P.L.L.C.

(57) ABSTRACT

Methods and systems are provided for non-cryptographic capabilities of a token such as a smartcard to be used as an additional authentication factor when multi-factor authentication is required. Smartcards are configured to generate a transaction code each time a transaction is attempted by the smartcard. The transaction code is dynamic, changing with each transaction, and therefore is used as a one-time password. When a user attempts to access a service or application requiring at least two authentication factors, a secure processor is used to read transaction code from the smartcard. The secure processor establishes a secure communication with the remote computer hosting the service or application. The transaction code can then be encrypted prior to transmission over the public Internet, providing an additional layer of security.

20 Claims, 4 Drawing Sheets

MULTI-FACTOR AUTHENTICATION USING A SMARTCARD

CROSS-REFERENCE TO RELATED APPLICATIONS

This application is a continuation of U.S. patent application Ser. No. 11/599,328, filed Nov. 15, 2006, which claims the benefit of U.S. Provisional Application No. 60/737,659, filed Nov. 16, 2005, all of which are herein incorporated by reference in their entireties.

FIELD OF THE INVENTION

This application relates generally to data communications and more specifically to information security.

BACKGROUND OF THE INVENTION

Certain types of on-line services and applications are targets for hackers and other malicious individuals attempting to gain access to sensitive user information. This is particularly true for on-line financial applications such as Internet banking, on-line payment sites, and on-line brokerages. Common techniques used by hackers include the installation of viruses, Trojan horses, or spyware on a user's computer, phishing schemes where a user is tricked into accessing a fake website having the look and feel of the legitimate site, and man-in-the-middle attacks involving the interception of communication from the user's computer and an external server or device.

Because of the risk associated with offering these on-line services over a relatively insecure network such as the Internet, federal regulators such as the Federal Financial Institutions Examination Council, have urged service providers to implement strong authentication for certain on-line financial applications and services. In particular, multi-factor authentication has been discussed as the preferred method for strong authentication. Authentication methodologies for individuals are generally involve three factors: something the user is (e.g., a biometric such as a fingerprint), something the user has (e.g., a security token generating a one-time password), and something the user knows (e.g., a password). Authentication methods that utilize more than one factor are more difficult to compromise than methods relying on a single factor.

Often when a user signs up or enrolls with a service provider for a financial service, the service provider will issue a token such as a smartcard, which enables the user to perform financial payment transactions such as making charges to or debits from the account. In many circumstances, because of the complexity of cryptographic key management and other factors, the service provider does not provide a fully cryptographically enabled smartcard. Alternatively, the service provide may not activate the cryptographic capabilities of the smartcard for transactional use.

In addition, a service provider may provide on-line applications or services to its users. For example, a service provider may provide access to an on-line financial account such as a bank account. Accordingly, a user may log-in to the account to perform the following actions, including but not limited to, moving money from one account to another, changing billing information, and receiving literature. Many of these transactions do not involve a financial payment transaction (e.g., using the smart card to perform a debit or credit transaction) for which a smartcard would normally be used. As described above, many of these on-line applications require an authentication factor in addition to a log-in/password combination.

Because the smartcard does not have cryptographic capabilities or does not have its cryptographic capabilities enabled, the smartcard by itself may not meet the security requirements necessary for an additional authentication factor. However, issuing and maintaining additional security tokens to be used as an additional authentication factor for accessing on-line services and applications may be cost prohibitive for many service providers.

What is therefore needed is methods and systems for utilizing existing smartcard capabilities as an authentication factor for on-line applications or services.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
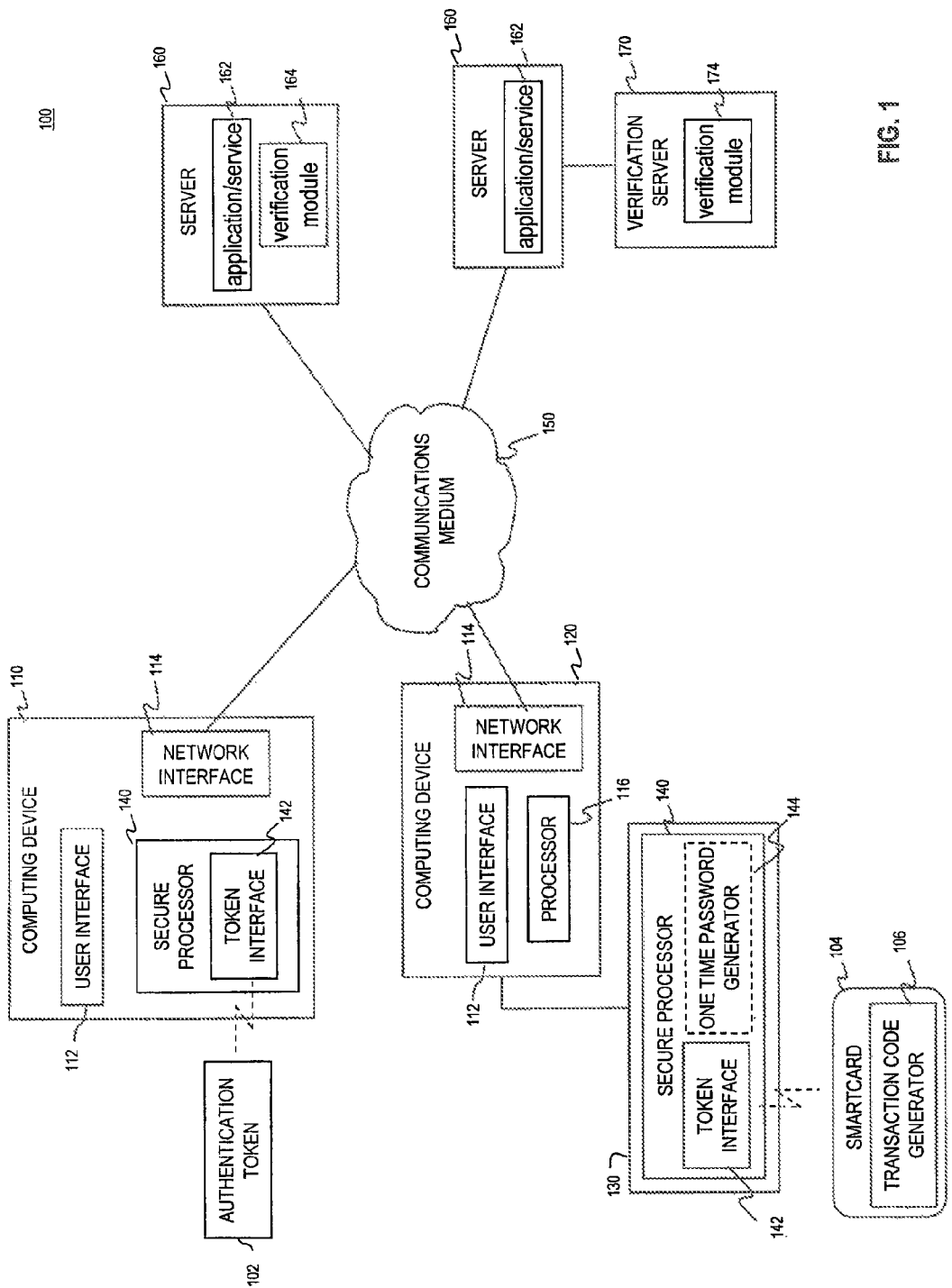
FIG. 1 is an exemplary operating environment for the use of non-cryptographic capability of a smartcard for multi-factor authentication, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

The following methods and systems make use of existing non-cryptographic capabilities of smartcards as an additional authentication mechanism.

FIG. 1 is an exemplary operating environment 100 for the use of a non-cryptographic capability of a smartcard for multi-factor authentication, according to embodiments of the present invention. Exemplary operating environment 100 includes a plurality of tokens 102, a plurality of smartcards 104, computing devices 110 having integrated secure processors, a plurality of computing devices 120, a plurality of external secure processing devices 130, a communications network 150, a plurality of servers 160, and at least one verification server 170.

Token 102 is a portable module which is issued by a service provider. A token 102 may be configured to provide payment services for a user (e.g., credit or debit cards). In addition, or alternatively, token 102 may be used to provide authentication data for access to resources, services, and/or applications. For example, a user may be assigned one token to access certain services through certain computing devices. In addition, the user may be assigned another token to access other services through the same or other computing devices. Also, multiple sets of authentication data may be included on a single token to enable a user to access different services or to enable multiple users to share a token.

Token 102 may be implemented in various physical forms depending on the needs of the respective applications. For example, token 102 may be in a form that is easy to carry, similar to a plastic credit card, smartcard, building access card, fob, etc. Also, a token may take a form that may be attached to or incorporated into another article. Examples of tokens 102 include, without limitation, smartcards, credit cards, dongles, badges, biometric devices such as fingerprint readers, mobile devices such as wireless phones, or PDAs.

Smartcard 104 is a type of token 102 which can be used to provide an additional authentication factor. As described above, cryptographic capabilities are not programmed into smartcard 104 or alternatively, are not fully enabled for transactional processing. However, an existing non-cryptographic capability of smartcard 104 can be used as an authentication factor.

Smartcard 104 includes a transaction code generator 106. Transaction code generator 106 is configured to generate a monotonically increasing value for each transaction attempted by the user of the smartcard. Because this transaction code changes with each transaction and is not likely the same for multiple smartcards at the same time, it can be used as a one-time password or alternatively used by processor 140 to create a one-time password. In this way, a non-cryptographically enabled smartcard can be used to provide an additional authentication factor when attempting to access certain on-line applications or services.

Smartcard 104 may be enabled for both payment and authentication purposes. Alternatively, smartcard 104 may be enabled only for authentication purposes. In an embodiment, smartcard 104 may be enabled as an additional authentication mechanism for multiple services and multiple service providers. Alternatively, smartcard 104 may be enabled as an authentication mechanism for a single service provider and/or a single service or application.

For example, accessing a service or device may involve accessing an on-line account or webpage that does not involve making a payment. For example, the user may have an account at an entity that provides the on-line service (e.g., on-line retailer from which user purchases goods). The user may maintain his or her smartcard information with the on-line entity. In this case, the on-line entity may have a record of the user's smartcard and also has the capability to verify a transaction made with that smartcard. Accordingly, the on-line entity may authenticate the user using one or more of the techniques described herein. For example, the user may inform the on-line entity that the smartcard is to be used as an authentication mechanism for certain services and applications. This may be accomplished, for example, by setting an appropriate indication in the user's record (e.g., registering the card as an authentication mechanism in the user's preferences).

Computing device 110 includes a user interface 112, a network interface 114, and an integrated secure processor 140. Computing device 120 includes a user interface 112, a network interface 114, and a processor 116. Unlike computing device 110, computing device 120 does not have an integrated secure processor 140. Both computing device 110 and computing device 120 may include an interface for coupling with an external secure processing device 130 (interface not shown). Computing device 110 or 120 is any device with a processor including, but not limited to, a personal computer, a laptop, a wireless phone, a personal digital assistant (PDA), or a personal entertainment device.

User interface 112 is configured to enable a user to interact with computing device 110 or 120 and to request access to remote applications and services. User interface 112 may include one or more output devices including, but not limited to, a display, indication lights, and a speaker. In addition, user interface 112 may include one or more input devices including, but not limited to, a keypad, button, pointing device, touch screen, audio device, and a soft-key-based menu. For example, authentication data such as a log-in/password pair may be entered via user interface 112.

Network interface 114 is configured to enable computing device 110 or 120 to communicate with network 150. In an embodiment, network interface 114 is a wired interface. In an additional or alternative embodiment, network interface 114 is a wireless interface.

Secure processing device 130 is a stand-alone device which may be coupled to computing device 110 or 120 to provide secure processing capabilities. Secure processing device 130 may be a dongle (e.g., a USB-based dongle) or any other device which can be coupled to a computing device. Secure processing device 130 includes a secure processor 140.

Secure processor 140 provides the required cryptographic operations to encrypt, decrypt, and/or authenticate data that is sent or received by the secure processor. In an embodiment, secure processor 140 includes a one-time password generation module 144. One-time password generation module 144 is configured to generate a one-time password based on a transaction code received from a smartcard. Secure processor 140 may comprise a processor, memory, dedicated cryptographic hardware, and a token interface 142. In addition, secure processor 140 may incorporate other security mechanisms. In an embodiment, secure processor 140 is designed to conform to a security specification relating to, for example, FIPS or TPM.

A security boundary associated with secure processor 140 may be established, for example, using hardware and/or cryptographic techniques. Hardware techniques for providing a security boundary may include, for example, placing components within a single integrated circuit. In addition, one or more integrated circuits may be protected by a physical structure using tamper evident and/or tamper resistant techniques such as epoxy encapsulation. Encryption techniques for establishing a security boundary may include, for example, encrypting sensitive information before it leaves secure processor 140. For this purpose, secure processor 140 may use one or more cryptographic processors and store the associated encryption/decryption keys in a secure memory internal to secure processor 140.

In an embodiment, secure processor 140 includes the capabilities to generate an asymmetric key pair (public/private key pair). In an alternative embodiment, the private key is "securely injected" into the secure processor 140. In the secure injection embodiment, the entity which injects the private key must "forget" the private key to ensure the integrity and privacy of the asymmetric key pair. In either embodiment, the private key does not leave the hardware security boundary of processor 140 unless encrypted. An exemplary system and process for securely generating an asymmetric key pair or securely injecting a private key into a processor is described in detail in U.S. Patent Publication No. 2005/0166051, entitled "System and Method for Certification of a Secure Platform," which is incorporated herein by reference in its entirety.

Token interface 142 is configured to communicate with token 102 or smartcard 104. In an embodiment, token interface 142 is a contact-based interface. In a contact-based interface, the secure processor 140 has one or more electrical connectors which make contact with electrical connectors on token 102 or smartcard 104. In addition or alternatively, token interface 142 is contactless interface. For example, secure processor 140 may communicate with a token 102 or smartcard 104 using radio frequency identification (RFID) induction technology, low frequency RFID, or near field communication (NFC) such as high frequency RFID, in accordance with, for example, ISO 14443 and ISO 15693). In an embodiment, token interface 142 includes a smartcard reader.

In some embodiments, token interface 142 resides within the security boundary associated with secure processor 140. In these embodiments, information received from token 102 or smartcard 104 may be securely maintained within secure processor 140. For example, a transaction code generated by the token 102 or smartcard 103 may be encrypted before it is communicated outside the chip within which secure processor 140 is implemented. In addition, the transaction code may be sent to server 160 or 170 via a secure connection. As a result, information from the token 102 or smartcard 104 remains secured, even if computing device 110 or 120 is compromised.

Through the use of a secure processor 140, the server can develop further assurance that a specific token or smartcard is truly proximate to a computing device at the time of the attempted access. This provides an additional layer of security. For example, using cryptographic techniques, a server may be assured that it is communicating with a particular secure processor and that a certain level of security is provided by that secure processor.

In an embodiment, computing devices 110 or 120 (or secure processor 140) directly access one or more servers 160 or 170 via a communications medium 150. Communications medium 150 may be a public data communications network such as the Internet, a private data communications network, the Public Switched Telephone Network (PSTN), a wireless communications network, or any combination thereof. The interface between the computing devices 110, 120 and communications network 150 can be a wireless interface or a wired interface.

Server 160 hosts one or more resources, applications, and/or services 162 to which a user is enrolled. Server 160 may comprise hardware and/or software configured to provide a resource, service, or application. For example, a server may include a processing system that handles access requests, authenticates the requestor, and facilitates access to the requested resource, service, or application.

In an embodiment, server 160 includes a verification module 164. Verification module 164 is configured to validate that the transaction code received from a smartcard 104 (via secure processor 140) is the transaction code which is expected. Verification module 164 includes an algorithm corresponding to the algorithm used to generate the code. For example, the algorithm verifies that the received transaction code matches a code that verification module 164 generates corresponding to smartcard 104 (e.g., within a window of values). If smartcard is also used as a payment device, verification module 164 may need to access one or more databases to determine whether any payment-based transactions have been made by the smartcard in order to establish the expected transaction code.

Verification server 170 provides validation services for payment transactions attempted by a smartcard. As such, verification server 170 receives validation requests each time a user attempts to perform a transaction (e.g., credit or debit) with the smartcard. For example, during a conventional transaction, verification service 170 may debit, credit, or charge a user's account based on a transaction made using the smart card. During this process, server 160 verifies the transaction code generated by the smartcard. If the code was verified as being the expected value, verification server 170 would communication an indication to the requester (e.g., point-of-sale terminal) that the transaction is authorized.

Verification server 170 includes a verification module 174. Verification module 174 is configured to receive a transaction code and optional transaction amount and to validate the transaction code. When smartcard 104 is being used to provide an authentication factor, the transaction amount is set to a $0 transaction. Hence, a $0 transaction may be used as a way to authenticate a user to a service that is not a financial transaction (e.g., logging in to an on-line account). One advantage of this approach is that a financial institution may use its standard back-end server to provide access to a non-payment financial service or application. That is, the same back-end server that authorizes a debit or credit transaction may be used to authorize access to an application or service. Moreover, this may be accomplished with relatively little or no change in the standard operations of the back-end server.

As would be appreciated by persons of skill in the art, the functionalities of verification server 170 and server 160 may be incorporated into the same device. As would be further appreciated by persons of skill in the art, connections between server 160 and communications medium 150 and between verification server 170 and server 160 can be wired or wireless.

Figure 2:
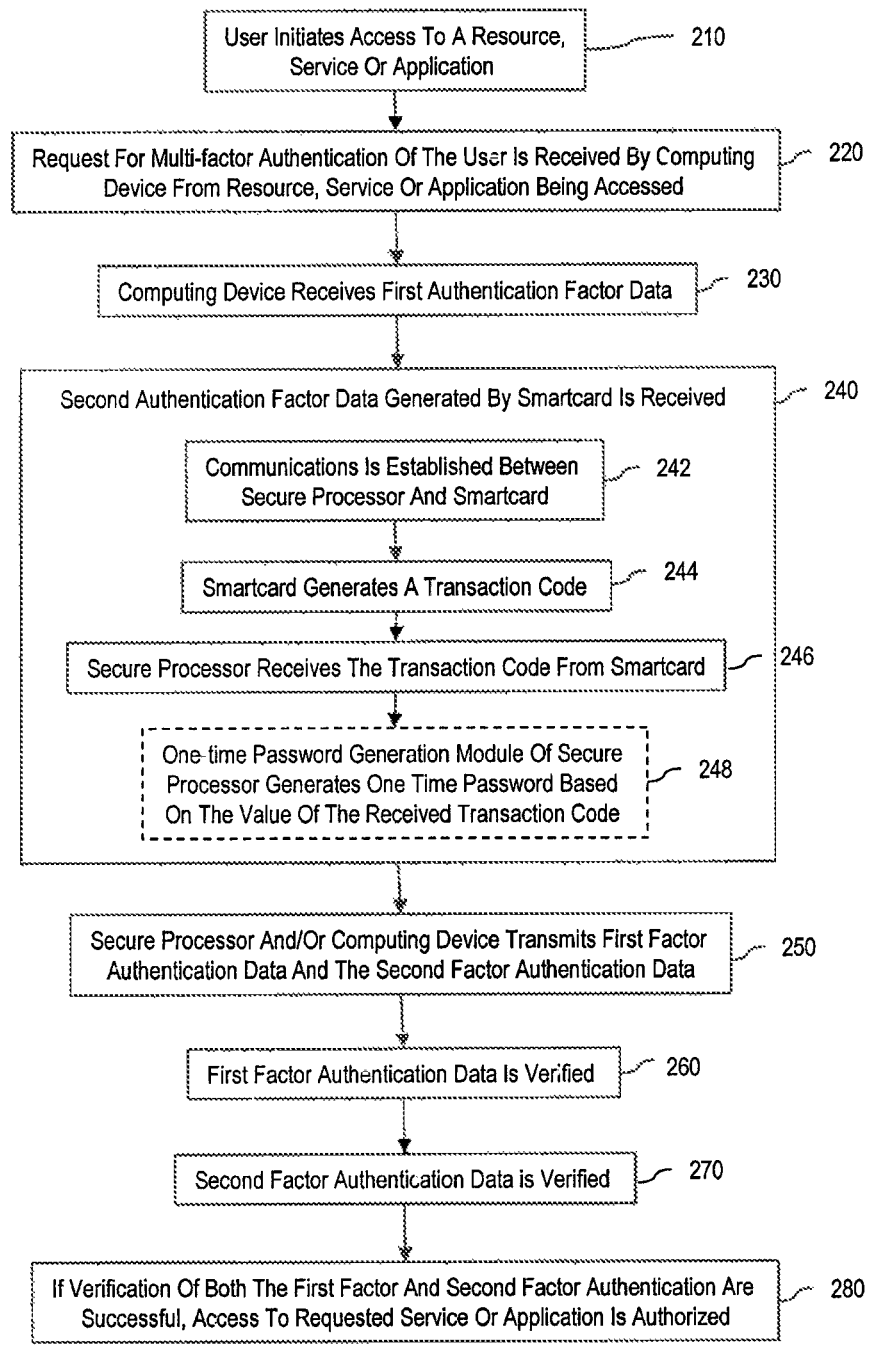
FIG. 2 depicts a flowchart of a method for multi-factor authentication using a smartcard, according to embodiments of the present invention.

FIG. 2 depicts a flowchart 200 of a method for multi-factor authentication using a smartcard, according to embodiments of the present invention. Flowchart 200 is described with continued reference to the exemplary operating environment depicted in FIG. 1. However, flowchart 200 is not limited to that embodiment. Note that some of the steps in flowchart 200 do not necessarily have to occur in the order shown.

Prior to step 210, a user enrolls or sets-up an account with a service provider. In an illustrative example, the service provider is a financial institution such as a bank, brokerage, credit union, etc. The service provider issues a smartcard to the user for conducting certain financial transactions such as purchasing a good or service. In addition, or alternatively, smartcard 104 may be issued as an additional authentication mechanism. At this point, or alternatively at the time of manufacture, the smartcard is programmed to generate a transaction code each time the user attempts to perform a financial transaction with the smartcard.

In conjunction with the process of issuing the smartcard to the user, the service provider may also establish a first authentication factor with the user. For example, the service provider may establish a log-in identifier (ID) and password for the user. The password is a secret that is shared between the service provider and the user. It may be selected by the user or alternatively, by the service provider. The log-in ID and password are then associated (also referred to as "bound") to the smartcard issued for the user. The service provider stores the log-in ID and password in a memory which can be accessed by applications or services provided by or on behalf of the service provider. In addition, memory may include smartcard authentication data (e.g., last transaction number received) or a pointer to authentication data for the smartcard. As would be appreciated by a person of skill in the art, the establishment of a log-in ID and password may occur after the issuance of a smartcard. In addition, a user may have multiple log-in ID/password pairs associated with a single smartcard (e.g., if service provider offers multiple services of if smartcard can be used for multiple service providers and/or services).

In step 210, a user initiates access to a resource, service or application 162 provided by or on-behalf of the service provider. Alternatively, a user initiates access to a service or application which allows authentication via a non-cryptographic capability of a smartcard. In an embodiment, the service or application allows the user to access his or her financial information or perform financial transactions over a public data network (e.g., Internet). A user may access service or application 162 via any suitable computing device. For example, a user may use a standard web browser to access a webpage through which a user can gain access to the desired application or service.

Alternatively, in step 210, a user initiates access to a resource, service, or application local to the computing device. For example, the user may initiate access to the computing device itself.

In step 220, a request for multi-factor authentication of the user is received by computing device 110/120 from the resource, service or application being accessed. In an embodiment, the resource, service or application requests first authentication factor data from the user. For example, the user may be presented with a webpage requesting the log-in ID and password for the service or application. The request may also include a request for a second authentication factor data from the user. In an alternative embodiment, a separate request is received for the second authentication factor data.

In step 230, computing device 110/120 receives first authentication factor data. For example, the user may enter log-in ID and password information via user interface 112. As would be appreciated by persons of skill in the art, any type of authentication, including a biometric, can be used as the first authentication factor.

In step 240, second authentication factor data generated by smartcard 104 is received. Step 240 includes steps 242-248.

In step 242, communications is established between secure processor 140 and smartcard 104. In an embodiment, secure processor 140 includes a contactless token interface 142. In this embodiment, communications is established by bringing smartcard 104 within the proximity of the token interface 142. In an alternative embodiment, secure processor 140 includes a contact-based token interface 142. In this embodiment, communications is established when the electrical connectors on smartcard 104 make contact with electrical connectors in token interface 142. The protocol used for communications between secure processor 140 and smartcard 104 is application and/or implementation dependent.

In step 244, smartcard 104 generates a transaction code. In an embodiment, smartcard 104 is programmed to generate a transaction code each time smartcard 104 is used for a transaction. The transaction code is a monotonically increasing value which is incremented each time a transaction is attempted by the smartcard. In an embodiment, secure processor 140 interacts with smartcard 104 to simulate a financial transaction. For example, secure processor 140 may communicate to smartcard 104 that a $0 transaction has been requested by the user to cause smartcard 104 to generate a transaction code. Because the transaction code changes with each transaction and is likely not to be the same at any one time for multiple smartcards, the transaction code can be used as a one time password. The use of a one-time password (e.g., a continually changing password) is advantageous since this may prevent a replay attack in which a prior value is intercepted and used by the hacker or malicious software in a subsequent access attempt.

In step 246, secure processor 140 receives the transaction code from smartcard 104.

In step 248, one-time password generation module 144 of secure processor 140 generates a one time password based on the value of the received transaction code. Step 248 is optional. When present, verification module 164 or 174 has a complementary algorithm for generating a one time password based on a transaction code.

In step 250, secure processor 140 and/or computing device 110 or 120 transmits the first factor authentication data and the second factor authentication data to the server hosting the service or application. Alternatively, the first factor authentication data and second factor authentication data may be communicated to a processor local to the computing device, if the user is requesting access to the computing device. As would be appreciated by persons of skill in the art, the first factor authentication data can be sent separately from the second factor authentication data. In an embodiment, secure communications is established between secure processor 140 and server 160 prior to transmission of the authentication data. Establishing secure communication is described in further detail in FIG. 3 below.

In step 260, the first factor authentication data is verified. For example, if a log-in and password were used as first factor authentication, server 160 verifies the received log-in/password pair against a database (or file) of log-in/password pairs.

In step 270, the second factor authentication data is verified. In an embodiment, server 160 verifies the second authentication factor. This verification method is described in more detail in FIG. 3 below. Alternatively, server 150 accesses a separate verification server 170 to verify the second authentication factor. This verification method is described in more detail in FIG. 4 below.

In step 280, if verification of both the first factor and second factor authentication are successful, access to requested resource, service or application is authorized.

Figure 3:
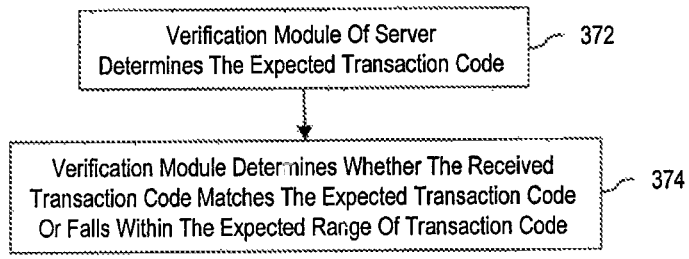
FIG. 3 depicts a flowchart of an illustrative method for verifying the transaction code in a verification module associated with server 160, according to embodiments of the present invention.

FIG. 3 depicts a flowchart 370 of an illustrative method for verifying the transaction code in a verification module associated with server 160, according to embodiments of the present invention. Flowchart 370 is described with continued reference to the illustrative system of FIG. 1. However, flowchart 370 is not limited to that embodiment.

In step 372, verification module 164 of server 160 determines the expected transaction code. In an embodiment, server 160 generates the expected value or a range of values that may be expected. Server 160 may execute an algorithm corresponding to an algorithm in one-time password module 144 of secure processor 140 to generate the expected value. In addition, server 160 may access one or more databases to obtain information necessary to determine the expected value.

In step 374, verification module 164 determines whether the received transaction code matches the expected transaction code or falls within the expected range of transaction code. If the transaction code matches the expected value or falls within the range of expected values, smartcard 104 is successfully authenticated.

Figure 4:
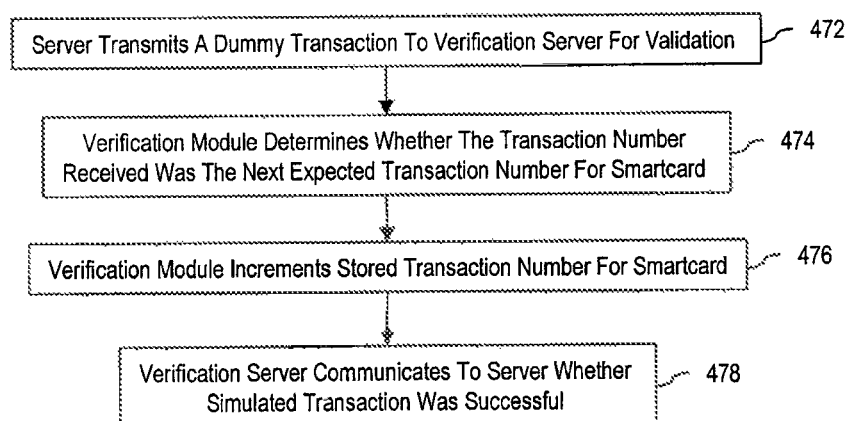
FIG. 4 depicts a flowchart of an illustrative method for verifying the transaction code by accessing a verification server, according to embodiments of the present invention.

FIG. 4 depicts a flowchart 470 of an illustrative method for verifying the transaction code by accessing a verification server, according to embodiments of the present invention. Flowchart 470 is described with continued reference to the illustrative system of FIG. 1. However, flowchart 470 is not limited to that embodiment. Note that some steps in flowchart 470 do not have to occur in the order shown.

In step 472, server 160 transmits a transaction request to verification server 170 for validation. Verification module 174 of verification server 170 may be used to validate all transactions attempted by the smartcard. Because verification module 174 acts as the single point of validation, the transaction information stored in verification module 174 for smartcard 104 tracks the transaction information from smartcard 140.

The transaction request includes the received transaction number and optionally a $0 transaction amount. The use of a $0 transaction amount allows server 160 to simulate a transaction. In this manner, existing capabilities of verification module 174 can be used for second factor authentication. That is, minimal or no changes to the verification module are necessary for second factor authentication verification.

In step 474, verification module 174 determines whether the transaction number received was the next expected transaction number for smartcard 104. If the transaction number is not expected, validation is not successful and the simulated transaction is rejected. If the transaction number is expected, validation is successful and the simulated transaction is allowed.

In step 476, verification module 174 increments the stored transaction number for smartcard 104. In an embodiment, verification module 174 stores the last transaction number received for smartcard 104. In addition or alternatively, verification module 174 stores the next expected transaction number for smartcard 104.

In step 478, verification server 170 communicates to server 160 whether the simulated transaction was successful.

Figure 5:
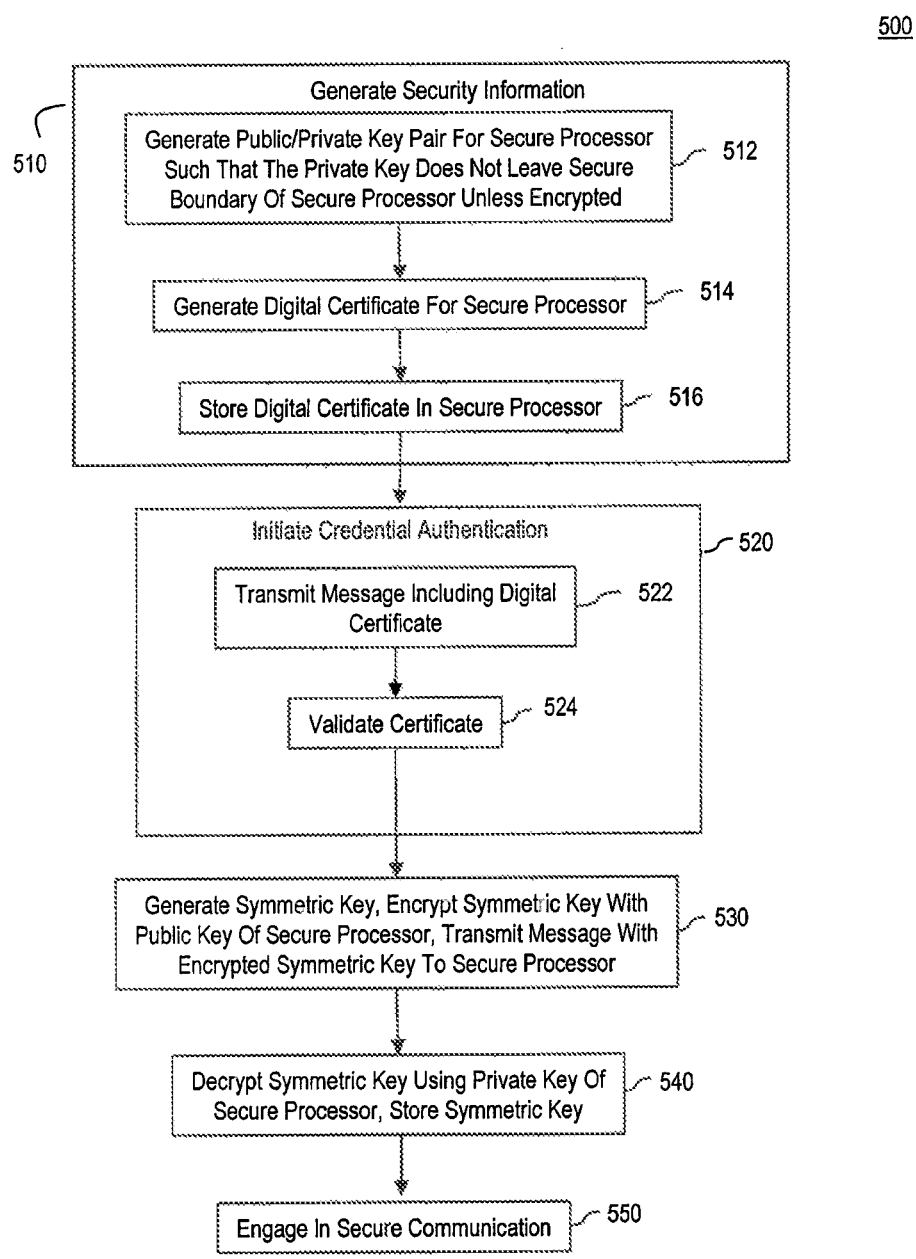
FIG. 5 depicts a flowchart of an illustrative method for secure communications between a secure processor and a server, according to embodiments of the present invention.

FIG. 5 depicts a flowchart 500 of an illustrative method for secure communications between a secure processor and a server, according to embodiments of the present invention. Flowchart 500 is described with continued reference to the illustrative system of FIG. 1. However, flowchart 500 is not limited to that embodiment. Note that some steps in flowchart 500 do not have to occur in the order shown.

In step 510, security information for secure processor 140 is generated. Step 510 includes steps 512-516. Step 510 generally occurs once per secure processor 140 prior to initial use of the secure platform.

In step 512, an asymmetric key pair (e.g., public/private key pair) is generated by secure processor 140 such that the private key does not leave the hardware security boundary of secure processor 140 unless encrypted. In an alternate embodiment, the private key is "securely injected" into secure processor 140. In the secure injection embodiment, the entity which injects the private key must "forget" the private key to ensure the integrity and privacy of the asymmetric key pair.

In step 514, a digital certificate is generated for secure processor 140. Step 514 may occur at the time of manufacture of the device. Alternatively, step 514 may occur when the secure processor is configured for use. As would be appreciated by a person of skill in the art, any procedure for generating a digital certificate can be used with the current invention. In an illustrative example, secure processor 140 initiates a key enrollment process with a certification authority. During the enrollment process, secure processor 140 communicates its public key and optionally identifying information. The certification authority then authenticates the identity of secure processor 140. The verification process can be performed in a variety of ways. For example, when the public/private key pair was generated by secure processor 140, secure processor 140 may share the public key, via a secure communication link, with a warranty server. The warranty server stores a listing of valid public keys for secure processors. In this example, the certification authority may query the warranty server to validate that the received public key is a valid public key for a secure processor. In addition or alternatively, the certification authority may validate the identification information provided by secure processor 140.

After the certification authority has authenticated the identity of secure processor 140, the certification authority issues a digital certificate for secure processor 140. The digital certificate binds the identity of the certificate owner (i.e., secure processor) to a public/private key pair. The digital certificate includes the public key of secure processor 140, a name or other identifier for secure processor, an expiration date, serial number, and identification of organization that issued the certificate. The certification authority signs the digital certificate using its private key. As would be recognized by persons of skill in the art, any technique for generating a signed certificate can be used with the present invention. Note that the public key of the certification authority must be publicly available to enable validation of the secure processor certificate.

In step 516, the digital certificate is stored in memory at secure processor 140.

In step 520, secure processor 140 initiates credential authentication with the server 160. Step 520 includes step 522 and step 524.

In step 522, secure processor 140 transmits a message including its digital certificate to server 160. Note that the messages in the exchange of step 522 between server 160 and secure processor 140 may include additional information to deter man-in-the-middle and replay attacks.

In step 524, server 160 validates the received certificate. In step 524 (or prior to step 524), server 160 obtains the public key of the certification authority which issued the certificate to secure processor 140. Server 160 then uses the public key of the certification authority to verify the signature included with the digital certificate. If the certificate is authentic, operation proceeds to step 530. If the certificate is not authentic, flowchart 500 ends.

In step 530, server 160 generates a symmetric key for use in securing communications with secure processor 140. As would be appreciated by persons of skill in the art, any technique for generating a symmetric key can be used with the present invention. In addition, in step 530, server 160 encrypts the symmetric key with the public key of the secure processor which was received in the digital certificate. Server 160 then transmits a message including the encrypted symmetric key to secure processor 140. Note that server 160 may assign an expiration date/time for the symmetric key. When the symmetric key "expires," steps 520 and 530 are repeated to establish a new symmetric key for communication between server 160 and secure processor 140.

In an embodiment, in step 530, server 160 generates a hash of the message (e.g., using HMAC, MAC, or CCMP) and signs the hash. The use of a digital signature provides a mechanism for secure processor 140 to verify that the message was received from a legitimate server 160. In addition, server 160 may sends its digital certificate to secure processor 140.

In step 540, secure processor 140 decrypts the message to obtain the symmetric key using its private key. The symmetric key is then stored in secure processor 140 for use in encrypting communication between secure processor 140 and server 160.

If the received message was signed by server 160, secure processor 140 verifies the signature in step 540. In an embodiment, secure processor 140 has a copy of the public key for server 160 stored in memory. Alternatively, secure processor 140 retrieves the public key from a remote database. Secure processor 140 then uses that public key to verify the signature on the message. Alternatively, server 160 may transmit a digital certificate to secure processor 140. In this embodiment, secure processor 140 must retrieve the public key of the certificate authority which issued server's certificate. Secure processor 140 then validates the authenticity of the provided certificate using the public key of the certificate authority. Secure processor 140 can then use the public key provided in the certificate to verify the signature on the message.

In step 550, secure processor 140 engages in secure communications with server 160.

From the above, it should be appreciated that the teachings herein may be used to provide a relatively convenient method for multi-factor authentication. For example, from a user's perspective, the user may only need to carry a standard smartcard that the user may typically carry anyway. Hence, with little inconvenience to the user, a user's on-line financial transaction can be made more secure. From the service provider's perspective, a financial institution can use the above methods and systems to achieve multi-factor authentication without the need to issue a separate token such as an RSA-type fob. Hence, a standard smartcard, which is not cryptographically enabled, can be used as an additional authentication factor. Accordingly, the institution may provide a desired level of security without the addition expense and management related to issuing authentication tokens.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for performing multi-factor authentication in a processor using a non-cryptographic capability of a smartcard, the method comprising:
    communicating, through a contactless or contact based token interface, a zero dollar financial payment transaction request to the smartcard to cause the smartcard to generate a transaction code;
    receiving the transaction code from the smartcard;
    communicating both a first authentication data and a second authentication data to a device, wherein the second authentication data is determined based on the transaction code; and
    receiving authorization to access a service for a reason independent of the zero dollar financial payment transaction request after the first authentication data and the second authentication data are verified by the device.

2. The method of claim 1, wherein the transaction code changes each time a financial payment transaction is attempted with the smartcard.

3. The method of claim 1, wherein the processor is local to the device.

4. The method of claim 1, wherein the first authentication data includes a user identifier and a password.

5. The method of claim 1, wherein the first authentication data includes a biometric template.

6. The method of claim 1, wherein the processor is a secure processor.

7. The method of claim 1, wherein communicating both the first authentication data and the second authentication data includes:
    establishing a secure communications session with the device.

8. The method of claim 7, wherein establishing the secure communications session with the device includes:
    transmitting a digital certificate for a secure processor to the device;
    receiving, an encrypted symmetric key from the device if the device successfully validated the digital certificate for the secure processor, wherein the symmetric key is encrypted with a public key of the secure processor;
    decrypting the encrypted symmetric key with a private key of the secure processor; and
    engaging in secure communications using the symmetric key to encrypt and decrypt communications.

9. A method for performing multi-factor authentication in a processor using a token as an authentication factor, the method comprising:
    receiving both a first authentication data and a second authentication data, wherein the second authentication data is determined based on a transaction code generated by the token in response to receiving a communication over a token interface for a zero dollar financial payment transaction request;
    verifying the first authentication data and the second authentication data; and
    authorizing access to a service after the first authentication data and the second authentication data are successfully verified.

10. The method of claim 9, wherein the first authentication data includes a user identifier and a password.

11. The method of claim 9, wherein the first authentication data includes a biometric template.

12. The method of claim 9, wherein verifying the second authentication data includes:
    determining an expected transaction code for the token; and
    determining whether the received second authentication data matches the expected transaction code.

13. The method of claim 9, wherein verifying the second authentication data includes:
    determining an expected transaction code for the token;
    generating a one-time password based on the expected transaction code; and
    determining whether the received second authentication data matches the generated one-time password.

14. The method of claim 9, wherein verifying the second authentication data includes:
    transmitting a financial payment transaction request to a verification server for validation, wherein the financial payment transaction request includes the second authentication data; and receiving a validation response, wherein the validation is successful if the transmitted second authentication data matches a transaction code for the token expected by the verification server.

15. The method of claim 14, wherein the transaction code changes each time a financial payment transaction is attempted with the token.

16. The method of claim 9, further comprising:
establishing a secure communications session with the device.

17. The method of claim 16, wherein establishing the secure communications session with the device includes:
receiving from the device a digital certificate including a public key for the device;
validating the received digital certificate;
generating a symmetric key;
encrypting the generated symmetric key with the public key of the device;
transmitting the encrypted symmetric key to the device; and
engaging in secure communications using the symmetric key to encrypt and decrypt communications.

18. A device for performing multi-factor authentication using a non-cryptographic capability of a smartcard, the device comprising:
a token interface configured to:
communicate a zero dollar financial payment transaction request to the smartcard to cause the smartcard to generate a transaction code, and
receive the transaction code from the smartcard; and
a processor configured to establish a secure communications session with a remote computing device and securely transmit a one-time password determined based on the transaction code as an additional authentication factor to the remote computing device.

19. The device of claim 18, wherein the transaction code changes each time a financial payment transaction is attempted with the smartcard.

20. The device of claim 18, wherein the processor is further configured to securely transmit a user identifier and a password to the remote computing device.

* * * * *